Dec. 27, 1927.
W. F. HENDERSON
1,654,253
METHOD OF AND APPARATUS FOR MAKING SAUSAGE CASINGS
Original Filed May 12, 1924   2 Sheets-Sheet 1
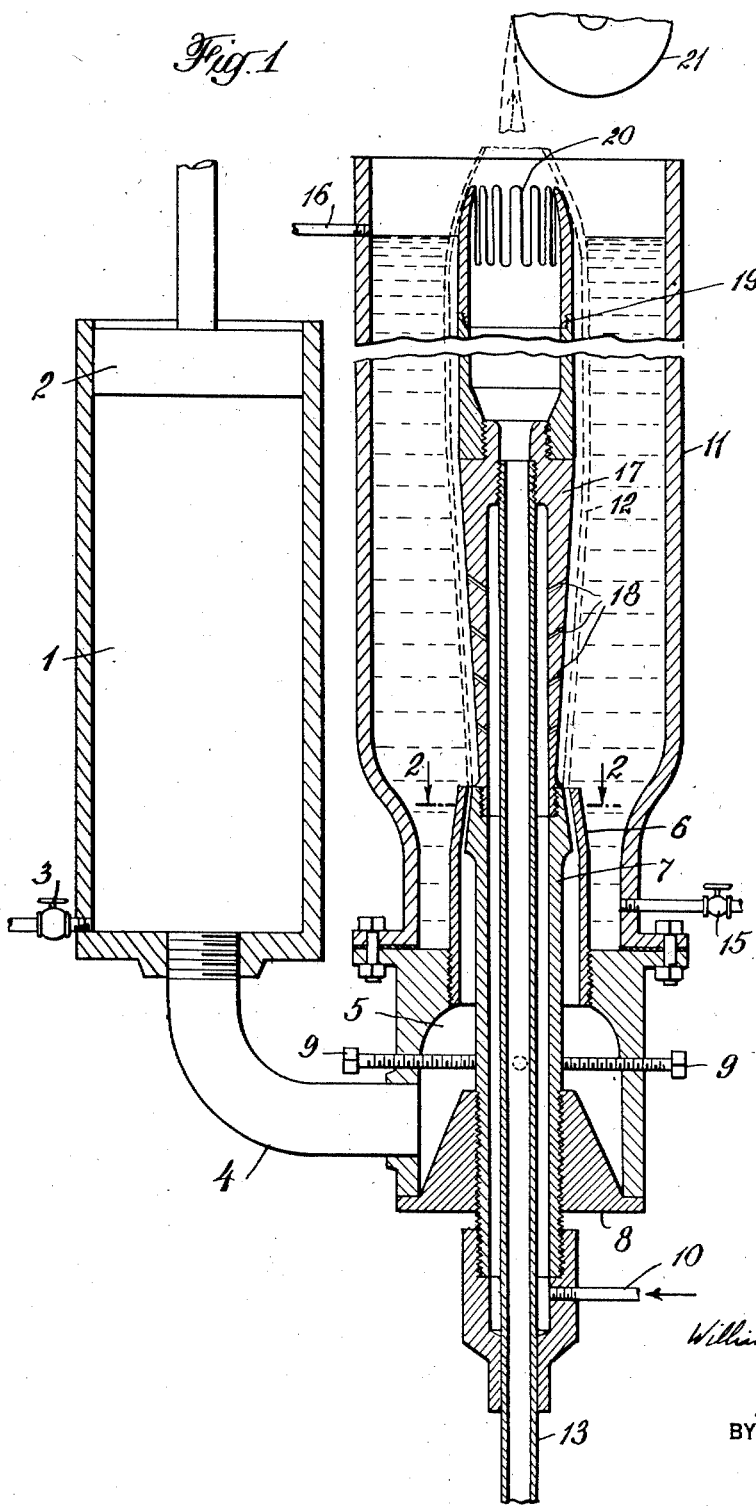

Dec. 27, 1927.
W. F. HENDERSON
1,654,253
METHOD OF AND APPARATUS FOR MAKING SAUSAGE CASINGS
Original Filed May 12, 1924   2 Sheets-Sheet 2
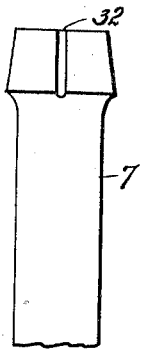
Fig. 3,
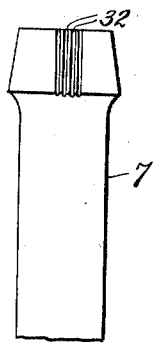
Fig. 4,
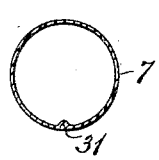
Fig. 5,
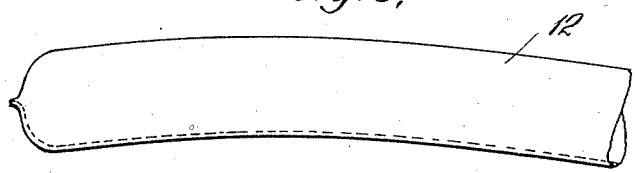
Fig. 6,
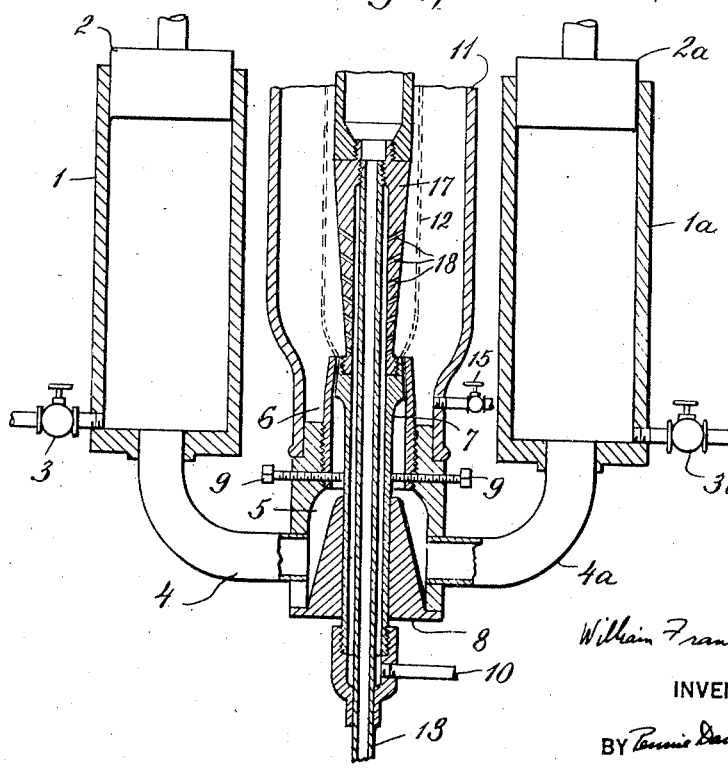
Fig. 7,
William Franklin Henderson
INVENTOR
BY
ATTORNEYS Patented Dec. 27, 1927.

1,654,253

UNITED STATES PATENT OFFICE.

WILLIAM FRANKLIN HENDERSON, OF PITTSBURGH, PENNSYLVANIA, ASSIGNOR, BY MESNE ASSIGNMENTS, TO VISKING CORPORATION, OF CHICAGO, ILLINOIS, A CORPORATION OF VIRGINIA.

METHOD OF AND APPARATUS FOR MAKING SAUSAGE CASINGS.

Original application filed May 12, 1924, Serial No. 712,640. Divided and this application filed August 26, 1926. Serial No. 131,560.

This invention relates to improvements in the production of edible sausage casings and includes improvements in the method and apparatus for producing them. This is a division of my copending application, Serial No. 712,640, filed May 12, 1924.

The large demand for meats enclosed in some sort of covering or casing and the changing world conditions upon which the supply of such coverings depends, have made it desirable, particularly in recent years, to devise a meat container, the source of which shall be quite independent of the meat packing industry. The production of natural casings by packers is limited, while the natural casings vary in diameter even in single lengths, thus making a standardized product, or a product of standard size, difficult to attain. The natural casings are further subject to the criticism concerning sanitation which is always associated with the source from which the casings are produced.

The desirability of supplying a source of coverings or casings independent of the meat packing industry has been accomplished to some extent by the use of woven bags and tubes and other related devices, and it has also been proposed to use seamed and also seamless tubes, of rather thick walls, made from plastic materials. The production of satisfactory seamless tubes, however, which are suitable for use as a container for sausages or wieners, is a difficult problem.

The present invention has for its object the production of curved, thin-walled, seamless sausage casings from plastic materials, such as, for example, viscose and other cellulosic materials which yield cellulose hydrate on regeneration protein substances and the like. These casings may be readily linked, and possess all the advantages of the natural sausage casings without their disadvantages. The invention also includes improvements in the preparation of some of the materials used and in the apparatus employed in forming the casings.

In the process of linking up sausages and wieners after the usual stuffing operation, two methods are employed; namely, (1) merely twisting the stuffed casings at intervals, thus producing a single string of links, or (2) tying the stuffed casing into a series of paired links. The first method is simpler and it is usually accompanied by less frequent bursting of the casings, and is, therefore, the procedure which is more commonly followed in practice. The employment of this simple twisting method of linking in connection with the casings produced from plastic materials, as, for example, those yielding cellulose hydrate, is accompanied by a tendency towards untwisting. With the intestinal casings generally used, this difficulty is not very apparent, partly because the intestinal tube is gently curved, the shorter side being the side which was originally attached to the mesentery in the animal.

The difficulties previously encountered with straight, seamless casings made from plastic materials are largely overcome by the casings here described which have a curve comparable with that of the natural casing and can readily be linked by twisting and do not exhibit the tendency to roll and untwist, which is possessed by straight casings. The casings here described, therefore, combine the advantages of the thin-walled seamless casings made from plastics with the ease of linking of the natural product.

The curved casings may be produced in various ways. For example, one side of a straight, seamless tube may be stretched mechanically, or in the case of certain plastics, for example, protein materials, an unequal chemical treatment of the two sides of the casings may be used to cause unequal shrinkage of the sides.

A second method consists in subjecting straight casings to an unequal chemical treatment of the two sides which will result in imparting a greater extensibility to one side so that when the casing is stuffed, one side will stretch more than the other and the stuffed sausage will assume the form of a curve. The same unequal stretch may also be produced by imbedding a relatively inextensible cord in one side of the casing.

Another method of producing curved casings is to coat a curved mandrel or form with a plastic material which is then rendered insoluble by drying, chemical treatment or the like. The hardened tube is then removed from the mandrel. In case very long lengths of casing are desired, the mandrel may be made in the shape of a spiral or helix.

I prefer, however, to produce sausage casings by extruding a plastic material through an annular orifice into a precipitating bath and drawing it away through the bath at such a rate as to produce relatively thin walls, preferably .001 to .003 inch in thickness. I have discovered that many plastics shrink on drying or on regenerating and I am able to produce curved casings by forming the tube with sides of unequal thickness with the result that the thicker side shrinks more than the thinner side, thus producing a curved casing. The effect is heightened by the fact that the thinner side is usually more extensible than the thicker side, so that when the casing is stuffed, the thinner side tends to stretch more than the thicker side and so still further increases the curvature of the casing. I can vary the curvature within fairly wide limits by varying the ratio of thickness of the two sides of the tube. A similar result may also be brought about by forming the two sides of different plastics which shrink unequally on drying or regenerating. The above two methods may also be combined, that is, one side may be made both thicker and of a material which has a greater shrinkage. The thickening of one of the sides of the tube may also be localized in the form of one or more ribs or ridges. The ribs may be of any shape, round, oval or flat and ribbonlike. They may run parallel to the axis of the casing or at an angle to it and may pass around the casing in the form of a spiral.

The casings will be illustrated by the following specific example using viscose as the plastic and employing the apparatus illustrated in the drawings. I have found that viscose prepared as described in the following specific example is a particularly suitable material for an improved sausage casing, but it should be clearly understood that my invention is not limited to any particular viscose or to viscose generally, and that any suitable plastic may be used as a raw material. My invention is not limited to the specific methods or apparatus described in the following example and these are to be considered as illustrating a preferred embodiment of the invention, but not as limiting the invention.

My preferred method of preparing viscose is as follows. The parts are by weight.

Six hundred parts of purified cotton linters are treated with 4000 parts of a 20% sodium hydroxide solution for 25 minutes at 10° C. The alkali is then pressed out until 2000 parts by weight of the fibrous mass remains. The material is then shredded and allowed to stand exposed to air at 18° C. for 5 hours. 300 parts of carbon disulfide are added to this ripened alkali cellulose which is allowed to remain without access to the air at 18° C. for about 18 hours. At the end of this period the yellow xanthate is placed in a mixer and enough ice water is added at intervals to bring the total weights up to 8400 parts. Preferably half of the water is added first in this way and throroughly mixed in and the material allowed to stand for about one hour in order to become hydrated; and the remaining ice water is then added in three portions as fast as it is thoroughly mixed in and the whole is worked until perfectly smooth. It is then placed in sealed receptacles and kept in a room maintained at about 10° C.

Any air or gas bubbles which are enclosed in the viscose will soon rise to the surface and are expelled. The material is then allowed to ripen at 10° C. until ready for use. The ripening period at 10° C. is about 11 days, after which the viscose is ready for use and can be formed into casings until it is about 17 or 18 days old. With certain baths, particularly those containing a high salt concentration, the viscose has been successfully used as early as the 6th day.

The specific method of producing the viscose described in the foregoing specific example gives a viscose product which dissolves completely in water and does not require purification either by filtration or by precipitation. Proper control of the viscosity requires that the amount of water used in making up the solution of viscose be rather narrowly limited. The alkali-cellulose loses some water by evaporation during its ripening, and this should be allowed for in making up the viscose solution in order to obtain a solution of definite cellulose content and viscosity.

When the viscose has been properly ripened, the viscose solution can be extruded without admixture of modifying material, such as oil. The viscose may, however, have various modifying materials incorporated therewith with but little danger of saponifying or decomposing the modifying material. A small quantity of a suitable vegetable oil or oils may be used and the viscose solution somewhat modified thereby, such oils altering to some extent the texture and elasticity of the casings and giving to the film a desirable opalescence. The presence of an oil in the viscose may also facilitate its extrusion by diminishing any tendency to stick to the metal parts, although I have obtained very satisfactory extrusion without the addition of such oils. A suitable amount of vegetable oil is, for example, 20 parts by weight of cotton seed oil for each 100 parts of cellulose in a solution of viscose which contains 7% by weight of cellulose. The film made from such a solution is softer and more elastic, as well as opalescent in appearance and very similar to the appearance of natural casings.

The method of treating the viscose solution for the formation of seamless tubes therefrom will be further described in connection with the accompanying drawings illustrating certain improved forms of apparatus adapted for the extrusion of the solutions and the treatment of the resulting tubes; but the specific apparatus is intended as illustrative only, and the invention is not limited thereto, although I have found apparatus of this character particularly advantageous for use. The invention includes the novel apparatus for carrying out the extrusion, as well as the improved method of extrusion.

In the accompanying drawing Fig. 1 shows, in a somewhat conventional and diagrammatic manner, a vertical section of one form of extrusion apparatus of the invention, adapted for the continuous production of thin-walled tubes. Fig. 2 is a horizontal cross section through the extrusion orifice taken along the line 2—2. Figs. 3 and 4 illustrate modified forms of cores for forming ribs on the extruded tube. Fig. 5 is a horizontal cross section through the sausage casing tube showing a single rib. Fig. 6 is perspective view of a sausage made with the improved casing. Fig. 7 is a vertical section of a modified extrusion apparatus forming tubes with sides of different materials.

In the apparatus illustrated in Figs. 1 and 2 and 7 the viscose or other plastic is extruded through an annular orifice upwardly through a chemical bath, which, with subsequent treatments, converts the viscose back into cellulose hydrate. The parts of the apparatus which are subject to corrosion on exposure to viscose are constructed of a suitable material, such as Monel metal, which is not affected by the viscose or by the baths employed.

The apparatus of Fig. 1 comprises a supply cylinder 1, in which operates a power driven piston 2. The container is supplied with a relief 3 at its bottom, so that, when the piston is raised, air may be sucked in. The supply receptacle 1 communicates by means of a short pipe 4 with the extrusion receptacle 5, on top of which is a nozzle 6, which, with the core 7, forms an annular orifice through which the viscose is extruded. The bottom of the extrusion receptacle consists of a removable cap or member 8, through which the core member 7 is screwed so that it will extend up into the nozzle 6.

In the form of apparatus illustrated in Figs. 1 and 2 the core 7 is not positioned in the center of the nozzle 6, but somewhat off center, as is shown in an exaggerated way in Fig. 2, in order to make one side of the extruded tube thicker than the rest of the tube. The exact adjustment of the eccentricity is maintained by the set screws 9, of which four are provided.

It will be noted that the top of the core 7 is even with the top of the nozzle 6, as illustrated in Fig. 1. This arrangement has been found advantageous in giving a smooth extrusion of the viscose.

In the modification shown in Fig. 7, a second container 1ª is provided, having a piston 2ª, a relief 3ª and a pipe 4ª entering the extrusion receptacle 5 on the side opposite to pipe 4. The core 7 may be positioned in the center of the nozzle 6 or may be somewhat off center. The adjustment of the core by means of the set screws 9 is the same as in apparatus illustrated in Fig 1.

Mounted on the member 5 is a container 11. This container serves to hold the regenerating liquid into which the viscose tube is extruded.

Extending upwardly from the hollow core 7 of the extrusion orifice is a hollow mandrel consisting of 3 parts, namely, a hollow cone 17 with perforations 18, a hollow cylindrical portion 19, and a cylindrical tip portion provided with a dentated tip 20, the bottom of the slots between the teeth being at about the level of the overflow pipe 16.

A large inner drain tube 13 extends downwardly from the upper part of the mandrel 17 and through the hollow core 7. Liquid similar to that used in the regenerating bath may be introduced through the pipe 10 and forced up around the drain tube 13 and through the perforations 18 into the casing 12 as it is formed, thus keeping it inflated, and permitting a constant renewal of the internal liquid. The internal liquid overflows into the drain pipe 13 which is made of very large diameter in comparison to the volume of liquid which flows through it and which is open to the atmosphere at the lower end. The resulting air passage maintained from the center of the drain pipe eliminates all suction effects due to the downward flow of the liquid in the drain pipe, and which would tend to collapse the extruded tube. The enlarged drain pipe makes it unnecessary to provide it with a valve. The container 11 has an inlet 15, which can also be used as an emergency drain, and an overflow outlet 16, thus permitting a slow change in the outside bath by the constant inflow of a fresh amount of regenerating liquid and the overflow of a corresponding amount of the spent or partly spent liquid.

A reel or drum 21 is placed above the extrusion apparatus to wind up the casing. The reel may advantageously be power driven from a suitable power source (not shown) and suitable regulating means may be provided to vary the speed of the reel.

Figs. 3 and 4 show cores provided with grooves 32 which form one or more ribs in the extruded casings as illustrated in Figs. 5 and 6, the rib being shown at 31.

In the operation of the apparatus shown in Fig. 1 the viscose is supplied to the container 1 and is forced by constant pressure through the annular extrusion nozzle to the regenerating bath. As the viscose tube is thus extruded it is drawn up through the liquid in the bath by means of the reel 21 and the tube is initially hardened by the passage through the regenerating bath. Regenerating liquid is also forced out through the perforations 18 in the lower conical portion of the mandrel 17 and flows up between the casing and the mandrel and passes between the teeth 20 and out through the large drain pipe 13. As the slots between the teeth 20 are at about the same level as the overflow pipe 16 the level of the liquid inside and outside the casing is substantially the same and there is no unbalanced force acting on the casing. The tube is further supported by the teeth 20 after emerging from the bath.

In the modification illustrated in Fig. 7, the containers 1 and 1ª are supplied with different materials, having different amounts of shrinkage on regeneration or drying. For example, two viscoses of different cellulose content may be used. The operation of the apparatus is the same as described above except that the extruded tube has sides formed of different materials. The core 7 may be placed in the center of the nozzle or it may be somewhat off-centered when it is desired to combine the features of unequal thickness of tube wall and walls made from different materials.

The diameter of the casing depends not only on the size of the annular orifice, but more particularly on the distension of the casing by means of the liquid introduced around the mandrel.

The thickness of the wall depends on three factors; namely, the concentration of cellulose in the viscose, the diameter to which the extruded tube is distended by the inside liquid, and the ratio between the rate of extrusion and the rate of withdrawal by the reel. The thickness is therefore not dependent upon the actual distance between the nozzle 6 and the core 7. A casing having a wall of only about .002 inch in thickness may be made by extruding the viscose from an orifice up to $\frac{1}{8}$-inch wide, and by drawing the tube upwards in the manner described, thus stretching the tube until it has the thinness mentioned. The use of a fairly wide orifice has the advantage of practically eliminating the difficulties due to accidental particles which would tend to clog up the opening. It is not necessary, however, to use an orifice as large as $\frac{1}{8}$-inch to obtain a casing of minimum thickness desired, and the size of the orifice allows of some variation. The drawing up of the casing into and through the precipitating bath causes the precipitation to take place while the casing is under tension, and this is very important in producing casings of very thin walls and of the proper texture.

As the thickness of the casing is dependent on three factors; namely the concentration of cellulose in the viscose, the amount of distention of the extruding tube by the inside liquid and the ratio between the rate of extrusion and the rate at which the casing is wound on the reel, a large number of combinations of the three factors are possible. For example, a seamless tube 1 inch in diameter and having walls of about 0.0012 inches in thickness may be formed by extruding 20 c. c. per minute of viscose prepared as described in the specific example given above at a linear speed of 14.5 inches at the orifice and drawing it over the reel at a rate of over 60 inches per minute. It should be understood that the above example is illustrative only and that the quantities and speed may be varied.

In order to produce a casing which shall possess a curvature, it is only necessary to change the adjustment slightly so that two opposite sides of the casing are of slightly different thickness. A curvature can be produced in a tube if one side is made slightly thicker than the opposite side. The shrinkage which subsequently occurs during the processes employed is not uniform and curvature results. If no marked shrinkage occurs in the material employed, the unequal thickness of the walls of the tube will give unequal extensibility so that, when tension is applied, such as occurs during the stuffing process one side will stretch more than the other, thus producing the desired curvature.

The thickness of one side may be varied by varying the eccentricity of the core 7 by means of the set screws 9. Various ratios of thickness of the sides are possible but I prefer to produce a casing having its thin side approximately 80% as thick as its thick side.

A similar effect can be secured by localizing the thickened area into a rib or ridge. For this purpose one or more grooves may be made in the core (Figs. 3 and 4) or nozzle parallel to its axis, such groove or grooves permitting more material to be extruded at such points, and, as the entire casing is drawn away, one or more ribs are produced in the wall. The width of the groove may be varied, but I may use, e. g., a groove about $\frac{1}{16}$-inch wide and 0.01 inch deep which produces a rib which will give the casing a marked curvature. For a casing produced according to the foregoing description the rib formed by $\frac{1}{16}$-inch by 0.01 inch groove is about 0.01 inch thick, the rib being much less effected by the drawing process than the rest of the casing. Multiple grooves (Fig. 4) may also be used and a corresponding number of ribs are then formed. A core having 4 grooves each 0.02 inches wide and 0.01 inch deep, and 0.02 inches apart give a casing with 4 ribs of an average thickness of 0.01 inch. The resulting casing shows a desirable curvature. It is to be understood, of course, that the invention is not restricted to the exact proportions of the grooves given above but these may be varied considerably and still produce casings having satisfactory curvature.

It will be evident that the length of seamless tubing which can be made with the apparatus just described depends upon the capacity of the supply receptacle 1. When only one such receptacle is used, it must sooner or later be refilled and the extrusion process interrupted. In order to make the process continuous, a plurality of supply receptacles of considerable size may be provided, so that, when one supply receptacle is nearly exhausted, a second may be started. Any other means for insuring a continuous flow of viscose may be used.

Seamless tubes having walls of two different plastics may be prepared by using the apparatus illustrated in Fig. 7. The receptacles 1 and 1ª are filled with plastics having different shrinking rates, for example, two viscoses of differing cellulose content. The operation is similar to the apparatus shown in Fig. 1. The extruded tube has sides composed of different materials and therefore will be curved on regeneration as one side will shrink more than the other. The core 7 may be placed centrally in the nozzle 6. If desired, the features of walls of varying thickness and differing material may be combined by off-setting the core so that one side of the tube is thicker than the other. Ribs may also be formed on one side of the tube as described above.

Instead of making seamless tubes of unlimited lengths they may be made for example by coating a rotating curved mandrel with a viscose solution and afterwards regenerating the coating to form cellulose hydrate. A mandrel in the form of helix may also be used. It is desirable to form the mandrel of a material which does not corrode from contact with the viscose or from alternate wetting and drying. A porcelain enameled steel tube may be used, or in case the process is carried out without the application of heat a Monel metal tube can be utilized.

The viscose employed may be of the same type previously described, but it should be diluted to reduce its viscosity, since viscose which has a very high viscosity cannot be smoothly spread on the mandrel. The viscose solution can be spread on the mandrel in any suitable way,; for example, by using mechanical spreading means.

After the mandrel has been coated, the viscose can be converted to cellulose hydrate; for example, by subjecting the coated mandrel to a drying atmosphere at 70° C. to 80° C. and later subjecting it to a higher temperature of around 105° to 110° C. at which the regeneration to cellulose hydrate is soon complete. On then plunging the mandrel into water for a few seconds, the casing can be slipped off without difficulty. The presence of a small amount of cane sugar, previously incorporated in the viscose, has been found to facilitate the removal, the sugar inducing diffusion currents inwardly through the casing, thus lifting it slightly from the surface of the mandrel.

The precipitating baths used in the formation of the cellulose tubes may be any of the usual precipitating baths used in the viscose art. I have found, however, that a substantially saturated sodium sulfate solution, preferably about 90% saturated with $Na_2SO_4$ is particularly advantageous when acidified with about .5 per cent of sulfuric acid. I have found it advisable to complete the regeneration of the casing by treatment with 5% sulfuric acid, which should then be thoroughly washed out. With thoroughly ripened viscose it is possible to use a neutral salt solution but is less advantageous as it soon becomes deep yellow in color and slightly alkaline and loses its rapid coagulating power, the addition of a small amount of sulfuric acid, however, maintains the rapid precipitating power of the bath and also keeps the bath clear. It also prevents the formation of crystals of sodium sulfate which otherwise tend to form when the sodium ions from the viscose are added to the already nearly saturated solution. A solution as described above precipitates viscose and starts regeneration and if the tube remains in the bath for several minutes the regeneration is completed. This, however, requires a bath of considerable depth, that is from 3 to 4 ft. and it is often convenient to complete the regeneration by a subsequent treatment of the tubes in other baths.

Further regeneration may be performed by the application of regenerating solutions to the inside and outside of the tubes, but since the walls of the tubes are very thin and porous they are readily penetrated by the liquids and it is usually unnecessary to apply the treating liquid to the inside of the tubes.

The precipitation of the viscose and regeneration of the cellulose is accompanied by a marked loss of water from the casing. The viscose described contains about 85% water, whereas the finished casing contains very much less. In order to retain as much water as possible associated with the cellulose casing it is preferably treated with a bath of dilute glycerine or ethylene glycol or other suitable emollient substances possessing hygroscopic properties. I have found a bath of about 30% glycerine solution to be very effective. After treatment in the emollient bath the casings are preferably passed through a wringer in order to move excess liquid. Care should be taken not to dehydrate the casing as this seriously impairs the texture of the product.

The new sausage casings are edible thin-walled seamless tubes of plastic materials and are particularly useful as containers for sausage or other similar meat products owing to the fact that they are curved and therefore lend themselves readily to linking. The casings made from cellulose hydrate are edible from the standpoint of chemical composition as well as from a general dietetic standpoint, and are well adapted to the conditions imposed in the packing industries. Sausages made with curved casings may be cooked in the same way as those using natural casings.

The improved process of the present invention makes it possible to produce curved casings and to carry out the process with a minimum of supervision. The use of a drainage tube of relatively large diameter also obviates the necessity of providing a valve in the drainage tube and constant supervision, in order to keep the level of the inner regenerating bath the same as that of the outer. The construction of the improved mandrel of the present invention not only provides an effective overflow for the inner bath but also gives additional support to the casing after it has emerged from the regenerating bath.

I claim:

1. The improvement in the manufacture of sausage casing which comprises extruding viscose of high viscosity or other suitable plastic upwardly into a treating bath in the form of a thin-walled, seamless tube having a thickened portion running lengthwise of the tube.

2. The improvement in the manufacture of sausage casing which comprises extruding viscose of high viscosity or other suitable plastic upwardly into a treating bath in the form of a thin-walled, seamless tube having at least one rib on one of the sides of the tube.

3. The improvement in the manufacture of sausage casing which comprises extruding viscose of high viscosity or other suitable plastic upwardly into a treating bath in the form of a thin-walled, seamless tube having sides of unequal thickness.

4. The improvement in the manufacture of sausage casing which comprises extruding viscose of high viscosity or other suitable plastic upwardly into a treating bath in the form of a thin-walled, seamless tube having a thickened portion running lengthwise of the tube and supporting the extruded tube while passing through the treating bath by introducing treating liquid into the inside of the tube and supporting the tube after it leaves the treating bath.

5. The improvement in the manufacture of sausage casing which comprises extruding viscose of high viscosity or other suitable plastic upwardly into a treating bath in the form of a thin-walled, seamless tube having at least one rib on one of the sides of the tube and supporting the extruded tube while passing through the treating bath by introducing treating liquid into the inside of the tube and supporting the tube after it leaves the treating bath.

6. The improvement in the manufacture of sausage casing which comprises extruding viscose of high viscosity or other suitable plastic upwardly into a treating bath in the form of a thin-walled, seamless tube having sides of unequal thickness and supporting the extruded tube while passing through the treating bath by introducing treating liquid into the inside of the tube and supporting the tube after it leaves the treating bath.

7. An apparatus for the extrusion of a curved sausage casing comprising means for supplying a plastic solution to an extrusion orifice, said orifice being adapted to extrude a tube having a thickened portion running lengthwise of the tube and being arranged to discharge upwardly into a vessel containing a precipitating bath and means for drawing the extruded casing upwardly through the bath.

8. An apparatus for the extrusion of curved sausage casing comprising means for supplying a plastic solution to an extrusion orifice, said orifice comprising a nozzle and an asymmetrically grooved core, and being arranged to discharge upwardly into a precipitating bath and means for drawing the extruded casing upwardly through said bath.

9. An apparatus for the extrusion of curved sausage casing comprising means for supplying a plastic solution to an extrusion orifice, said orifice being adapted to extrude a tube having a thickened portion running lengthwise of the tube and being arranged to discharge upwardly into a vessel containing a precipitating bath, means for drawing the extruded casing upwardly through the bath, and means for supporting the casing after it leaves the bath.

10. An apparatus for the extrusion of curved sausage casing comprising means for supplying a plastic solution to an extrusion orifice, said orifice comprising a nozzle and an asymmetrically grooved core, said orifice being arranged to discharge upwardly into a precipitating bath, means for supporting the casing after it leaves the bath and means for drawing the extruded casing upwardly through the bath.

11. An apparatus for the extrusion of curved sausage casing comprising means for supplying a plastic to an extrusion orifice, said orifice being adapted to extrude a tube having a thickened portion extending lengthwise of the tube and being arranged to discharge upwardly into a vessel containing a precipitating bath, means for introducing treating liquid into the interior of the extruded tube, automatic means for maintaining the level of the liquid in the interior of the tube constant, means for supporting the tube after it leaves the bath, and means for drawing the extruded casing upwardly through the bath.

12. An apparatus for the extrusion of curved sausage casing comprising means for supplying a plastic to an extrusion orifice, said orifice comprising an asymmetrically grooved core and being arranged to discharge upwardly into a vessel containing a precipitating bath, means for introducing treating liquid into the interior of the extruded tube, automatic means for maintaining the level of the liquid in the interior of the tube constant, means for supporting the tube after it leaves the bath, and means for drawing the extruded casing upwardly through the bath.

13. In an apparatus for the extrusion of sausage casing comprising an extrusion orifice discharging upwardly into a precipitating bath, means for supplying a plastic solution to said orifice and a mandrel above said orifice around which the extruded tube is supported by means of a precipitating liquid forced between the mandrel and the tube, the improvement which comprises means which automatically maintains the level of the internal precipitating liquid, said means comprising a drain pipe through the center of the mandrel, the diameter of said pipe being substantially greater than the diameter of the inflow pipe for the precipitating liquid.

14. An apparatus for the extrusion of curved sausage casing comprising means for supplying a plastic solution to an annular extrusion orifice of irregular contour, said orifice being arranged to discharge upwardly into a precipitating bath, and means for drawing the extruded casing upwardly through the said bath.

15. An apparatus for the extrusion of curved sausage casing comprising means for supplying a plastic solution to an extrusion orifice, said orifice comprising a nozzle and core, at least one of which has an irregular surface exposed to the orifice, the said orifice being arranged to discharge upwardly into a precipitating bath, means for supporting the casing after it leaves the bath, and means for drawing the extruded casing upwardly through the bath.

In testimony whereof I affix my signature.

WILLIAM FRANKLIN HENDERSON.